(12) United States Patent
Ye et al.

(10) Patent No.: US 11,587,338 B2
(45) Date of Patent: Feb. 21, 2023

(54) THREE-DIMENSIONAL OBJECT DETECTION METHOD, ELECTRONIC DEVICE AND READABLE STORAGE MEDIUM

(71) Applicant: BEIJING BAIDU NETCOM SCIENCE AND TECHNOLOGY CO., LTD., Beijing (CN)

(72) Inventors: Xiaoqing Ye, Beijing (CN); Xiao Tan, Beijing (CN); Hao Sun, Beijing (CN); Hongwu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 206 days.

(21) Appl. No.: 17/211,491

(22) Filed: Mar. 24, 2021

(65) Prior Publication Data
US 2021/0209341 A1    Jul. 8, 2021

(30) Foreign Application Priority Data

May 15, 2020    (CN) .......................... 202010412462.X (51) Int. Cl.
*G06K 9/00*    (2022.01)
*G06V 20/64*   (2022.01)
(Continued)

(52) U.S. Cl.
CPC ............ *G06V 20/647* (2022.01); *G06T 3/00* (2013.01); *G06T 7/50* (2017.01); *G06T 7/60* (2013.01);
(Continued)

(58) Field of Classification Search
CPC .......... G06V 20/647; G06T 3/00; G06T 7/50; G06T 7/60; G06T 7/73; G06T 2207/30244
See application file for complete search history.

(56) References Cited

U.S. PATENT DOCUMENTS

| 2014/0177915 A1* | 6/2014 | Fan ........................ G06T 7/593 382/103 |
| 2020/0082180 A1* | 3/2020 | Wang ....................... G06T 7/80 |

(Continued)

FOREIGN PATENT DOCUMENTS

| CN | 110517349 A  *  11/2019 |
| CN | 110765974 A  *  2/2020 |

(Continued)

OTHER PUBLICATIONS

Monocular 3D Object Detection for Autonomous Driving, Xiaozhi Chen et al., IEEE, 2016, pp. 2147-2156 (Year: 2016).*

(Continued)

*Primary Examiner* — Jayesh A Patel
(74) *Attorney, Agent, or Firm* — Lathrop GPM LLP (57) ABSTRACT

The present disclosure provides a three-dimensional (3D) object detection method, a 3D object detection apparatus, an electronic device, and a readable storage medium, belonging to a field of computer vision technologies. Two-dimensional (2D) image parameters and initial 3D image parameters are determined for a target object. Candidate 3D image parameters are determined for the target object based on a disturbance range of 3D parameters and the initial 3D image parameters determined for the target object. Target 3D image parameters are selected for the target object from the candidate 3D image parameters determined for the target object (Continued)

determining 2D image parameters and initial 3D image parameters for a target object based on an image of the target object captured by a monocular camera
110 determining candidate 3D image parameters for the target object based on a disturbance range of 3D parameters and the initial 3D image parameters 120 selecting target 3D image parameters for the target object from the candidate 3D image parameters for the target object based on the 2D image parameters, and determining a 3D detection result of the target object based on the target 3D image parameters
130 based on the 2D image parameters. A 3D detection result of the target object is determined based on the target 3D image parameters.

20 Claims, 4 Drawing Sheets

(51) Int. Cl.
  *G06T 7/50* (2017.01)
  *G06T 7/73* (2017.01)
  *G06T 3/00* (2006.01)
  *G06T 7/60* (2017.01)
(52) U.S. Cl.
  CPC ...... *G06T 7/73* (2017.01); *G06T 2207/30244* (2013.01); *G06V 2201/07* (2022.01)

(56) References Cited

U.S. PATENT DOCUMENTS

| | | | |
|---|---|---|---|
| 2020/0143557 A1* | 5/2020 | Choi | G06T 7/62 |
| 2021/0174537 A1* | 6/2021 | Ye | G06K 9/6267 |

FOREIGN PATENT DOCUMENTS

| | | | | |
|---|---|---|---|---|
| CN | 110969064 A | | 4/2020 | |
| CN | 111079619 A | * | 4/2020 | ......... G06K 9/00208 |
| CN | 111079619 A | | 4/2020 | |
| CN | 111126269 A | | 5/2020 | |
| JP | 2000107183 A | | 4/2000 | |
| JP | 2009032123 A | | 2/2009 | |

OTHER PUBLICATIONS

Deep Fitting Degrre Scoring Network for Monocular 3D Object Detection, Lijie Liu et al, IEEE, 2019, pp. 1057-1066 (Year: 2019).*
Monocular 3D Object Detection—Estimation, Yingjie Cai et al., arXiv:2002.01619v1, Feb. 5, 2020, pp. 1-10 (Year: 2020).*
Chinese Patent Application No. 202010412462.X Office Action dated Mar. 25, 2021, 6 pages.
Chinese Patent Application No. 202010412462.X English translation of Office Action dated Mar. 25, 2021, 5 pages.
Hu, Z. "3D Object Detection Based on Deep Learning" Thesis, Xidian Univ, May 2018, 83 pages.
Liu, L, et al. "Deep Fitting Degree Scoring Network for Monocular 3D Object Detection" 2019 IEEE/CVF Conference on Computer Vision and Pattern Recognition (CVPR); pp. 1057-1066.
Japanese Patent Application No. 2021-078980, Office Action dated Jul. 5, 2022, 4 pages.
Japanese Patent Application No. 2021-078980, English translation of Office Action dated Jul. 5, 2022, 4 pages.
European Patent Application No. 21164560.1 Search and Opinion dated Jan. 28, 2022, 11 pages.
Cai, Y. et al. "Monocular 3D Object Detection with Decoupled Structured Polygon Estimation and Height-Guided Depth Estimation" arXiv:2002.01619, Feb. 2020, 10 pages.
Chen, X, et al. "Monocular 3D Object Detection for Autonomous Driving" Jun. 2016 IEEE Conference on Computer Vision and Pattern Recognition, pp. 2147-2156.

* cited by examiner determining 2D image parameters and initial 3D image parameters for a target object based on an image of the target object captured by a monocular camera
110 determining candidate 3D image parameters for the target object based on a disturbance range of 3D parameters and the initial 3D image parameters 120 selecting target 3D image parameters for the target object from the candidate 3D image parameters for the target object based on the 2D image parameters, and determining a 3D detection result of the target object based on the target 3D image parameters
130

FIG. 1

FIG. 2 determining 2D image parameters and initial 3D image parameters for a target object based on an image of the target object captured by a monocular camera
210 determining candidate 3D image parameters for the target object based on a disturbance range of 3D parameters and the initial 3D image parameters 220 filtering the candidate 3D image parameters determined for the target object based on a right-angle constraint of object bottom vertexes
230 selecting the target 3D image parameters from the candidate 3D image parameters satisfying the right-angle constraint based on the 2D image parameters and a distance constraint of distances between the object bottom vertexes and a 2D detection frame, and determining a 3D detection result of the target object based on the target 3D image parameters
240

FIG. 3 determining 2D image parameters and initial 3D image parameters for a target object based on an image of the target object captured by a monocular camera
310 determining candidate 3D image parameters for the target object based on a disturbance range of 3D parameters and the initial 3D image parameters
320 transforming the image positions of the candidate bottom vertexes to ground positions of the candidate bottom vertexes in a ground coordinate system
330 selecting a candidate bottom vertex group satisfying the right-angel constraint of the object bottom vertexes based on the ground positions of the candidate bottom vertexes
340 selecting the target 3D image parameters from the candidate 3D image parameters satisfying the right-angle constraint based on the 2D image parameters and a distance constraint of distances between the object bottom vertexes and a 2D detection frame and determining a 3D detection result of the target object based on the target 3D image parameters
350

FIG. 4 determining 2D image parameters and initial 3D image parameters for a sample object based on a sample image of the sample object captured by a monocular camera
410 determining a disturbance range of 3D parameters based on labeled 3D image parameters and the initial 3D image parameter determined for the sample object
420 determining 2D image parameters and initial 3D image parameters for a target object based on an image of the target object captured by the monocular camera
430 determining candidate 3D image parameters for the target object based on the disturbance range of 3D parameters and the initial 3D image parameters determined for the target object
440 selecting target 3D image parameters for the target object from the candidate 3D image parameters for the target object based on the 2D image parameters, and determining a 3D detection result of the target object based on the target 3D image parameters
450

FIG. 5

3D object detection apparatus 500 initial 3D parameter module 501 candidate 3D parameter module 502

3D optimizing module 503

THREE-DIMENSIONAL OBJECT DETECTION METHOD, ELECTRONIC DEVICE AND READABLE STORAGE MEDIUM

CROSS REFERENCE TO RELATED APPLICATIONS

This application claims priority and benefits to Chinese Application No. 202010412462.X, filed on May 15, 2020, the entire content of which is incorporated herein by reference.

TECHNICAL FIELD

The application relates to a field of image processing technologies, particularly to a field of computer vision technologies, and specifically to a three-dimensional object detection method and a three-dimension object detection apparatus, an electronic device, and a readable storage medium.

BACKGROUND

With rapid development of computer vision technologies, three-dimensional (3D) object detection is widely used in all areas of work and life. For example, with the development of city size, the demand for vehicles is increasing. 3D vehicle detection technology is the basis of vehicle monitoring, which is of great significance in areas such as intelligent transportation and smart city.

SUMMARY

A 3D object detection method includes: determining two-dimensional (2D) image parameters and initial 3D image parameters for a target object based on an image of the target object captured by a monocular camera; determining candidate 3D image parameters for the target object based on a disturbance range of 3D parameters and the initial 3D image parameters determined for the target object; selecting target 3D image parameters for the target object from the candidate 3D image parameters determined for the target object based on the 2D image parameters, and determining a 3D detection result of the target object based on the target 3D image parameters.

An electronic device includes: at least one processor; and a memory communicating with the at least one processor. The memory is configured to store instructions executable by the at least one processor. The instructions are executed by the at least one processor to cause the at least one processor to determine two-dimensional (2D) image parameters and initial 3D image parameters for a target object based on an image of the target object captured by a monocular camera; determine candidate 3D image parameters for the target object based on a disturbance range of 3D parameters and the initial 3D image parameters determined for the target object; select target 3D image parameters for the target object from the candidate 3D image parameters determined for the target object based on the 2D image parameters, and determine a 3D detection result of the target object based on the target 3D image parameters.

A non-transitory computer-readable storage medium has computer instructions stored thereon. The computer instructions are configured to cause a computer to execute the 3D object detection method. The method includes: determining two-dimensional (2D) image parameters and initial 3D image parameters for a target object based on an image of the target object captured by a monocular camera; determining candidate 3D image parameters for the target object based on a disturbance range of 3D parameters and the initial 3D image parameters determined for the target object; selecting target 3D image parameters for the target object from the candidate 3D image parameters determined for the target object based on the 2D image parameters, and determining a 3D detection result of the target object based on the target 3D image parameters.

It should be understood, the content described herein is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the present disclosure, and do not constitute a limitation to the disclosure.

FIG. 3 is a flowchart illustrating a 3D object detection according to some embodiments of the present disclosure.

FIG. 4 is a flowchart illustrating a 3D object detection method according to some embodiments of the present disclosure;

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Three-dimensional (3D) vehicle detection technology is a basis of vehicle monitoring, which is of great significance in areas such as intelligent transportation and smart city. Target 3D detection technology mainly relies on a binocular camera and laser radar, with disadvantages of high complexity, low detection efficiency, high cost, and low detection precision.

Therefore, embodiments of the present disclosure provide a 3D object detection method, a related electronic device, and a non-transitory computer-readable storage medium.

The present disclosure may solve problems of high cost, low efficiency, and low precision in the 3D object detection process, achieves efficient and precise 3D object detection with the monocular camera, and reduces cost of the 3D object detection.

Figure 1:
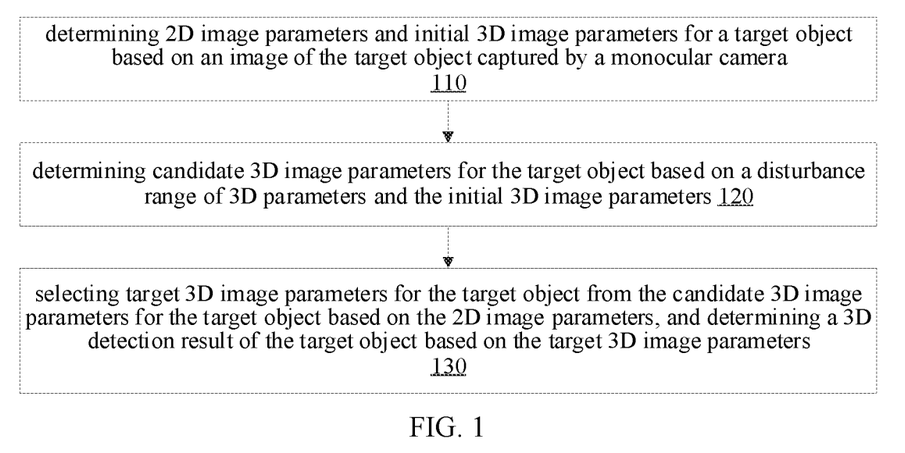
FIG. 1 is a flowchart illustrating a three-dimensional (3D) object detection method according to some embodiments of the present disclosure.

FIG. 1 is a flowchart illustrating a three-dimensional (3D) object detection method according to some embodiments of the present disclosure. Embodiments of the present disclosure is suitable for determining and optimizing vertexes of a 3D detection frame contained in an object image collected by a monocular camera. The 3D object detection method according to embodiments of the present disclosure may be executed by an electronic device and a 3D object detection apparatus. The apparatus may be implemented by software and/or hardware and integrated into the electronic device. As illustrated in FIG. 1, the 3D object detection method according to some embodiments of the present disclosure may include the following.

At block 110, two-dimensional (2D) image parameters and initial 3D image parameters are determined for a target object based on an image of the target object captured by a monocular camera.

The monocular camera may be provided in any scenario that needs to perform the 3D object detection. For example, the monocular camera may be provided in a vehicle monitoring scenario, or the monocular camera may be provided in an autonomous vehicle as a sensing sensor. The target object refers to an object to be detected, which may be a vehicle or an environmental object, etc. The image of the target object may be captured by a target camera, which is a 2D image of the target object.

Figure 2:
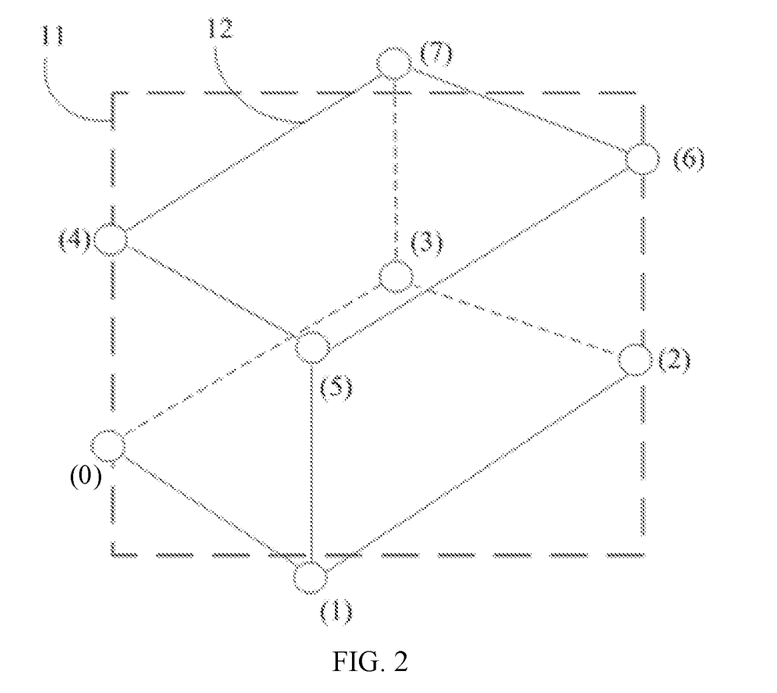
FIG. 2 is a diagram illustrating an object detection frame according to some embodiments of the present disclosure.

As illustrated in FIG. 2, a 2D detection frame 11 and a 3D detection frame 12 contained in the image of the target object may be extracted by recognizing the image of the target object. The 3D detection frame has 8 vertexes. The 2D image parameters determined for the target object refer to parameters of the 2D detection frame of the target object in an image coordinate system. The initial 3D image parameters refer to initial parameters of the 3D detection frame of the target object in the image coordinate system. It should be noted, since the initial 3D image parameters are determined based on the 2D image captured by a monocular camera, the initial 3D image parameters may have some errors and need to be optimized to improve the precision of the 3D detection.

In some examples, the block 110 may include obtaining the 2D image parameters and 3D detection parameters for the target object by inputting the image of the target object to an image detection model.

In some implementations, 3D detection parameters of the target object may include size of the target object, a center-point camera position of a center point of the target object in a camera coordinate system and an orientation angle of the target object. Vertex positions of the 3D detection frame of the target object are determined by processing the 3D detection parameters of the target object, as the initial 3D image parameters.

In some implementations, the 3D detection parameters of the target object include positions of the vertexes of the 3D detection frame of the target object in the image coordinate system. That is, the 2D image parameters and the initial 3D image parameters may be directly output by the image detection model.

At block 120, candidate 3D image parameters are determined for the target object based on a disturbance range of 3D parameters and the initial 3D image parameters determined for the target object.

The disturbance range of 3D parameters refers to disturbance ranges of vertexes of the 3D detection frame of the target object. As illustrated in FIG. 2, for the convenience of subsequent processing, the disturbance range may refer to the disturbance ranges of the bottom vertex 0, 1 and 2 of the 3D detection frame 12 is approximately located on an edge of the 2D detection frame 11. In detail, a sample image of a sample object captured by the monocular camera may be processed in advance to obtain the disturbance range of 3D parameters. The candidate 3D image parameters determined for the target object refers to image parameters of candidate vertexes of the 3D detection frame of the target object, such as image positions of candidate bottom vertexes.

In detail, the image positions of multiple candidate vertexes may be obtained based on an image position of an initial vertex of the 3D detection frame of the target object as well as the disturbance range of the initial vertex. For example, the image position of an initial bottom vertex 0 is $(u_0, v_0)$, the disturbance range of $u_0$ is [−10, 5], and the disturbance range of $v_0$ is [−4, 6]. The multiple candidate vertexes may be obtained in a pixel area corresponding to [$(u_0-10)$, $(u_0+5)$] and [$(v_0-4)$, $(v_0+6)$]. Similarly, multiple candidate vertexes of other bottom vertexes may be obtained.

At block 130, target 3D image parameters are selected from the candidate 3D image parameters based on the 2D image parameters, and a 3D detection result of the target object is determined based on the target 3D image parameters.

In detail, the initial 3D image parameters are optimized based on the 2D image parameters and the candidate 3D image parameters. The target 3D image parameters are selected from the candidate 3D image parameters based on an optimization result. For example, an image position of a target bottom vertex is selected. The target 3D image parameters are transformed to parameters in a camera coordinate system, to obtain the 3D detection result of the target object in the camera coordinate system. The initial 3D image parameters having some errors are optimized based on the 2D image parameters as well as the candidate 3D image parameters, to obtain the target 3D image parameters. Therefore, this algorithm has low complexity, and this method of performing the 3D detection using the monocular camera has low cost and high efficiency compared with the 3D object detection technology that relies on a laser radar or a binocular camera.

In some implementations, the block 130 may include transforming the target 3D image parameters to target 3D camera parameters in the camera coordinate system as the 3D detection result of the target object, based on camera intrinsic parameters.

The camera intrinsic parameters may be a focal length, a focal position of the monocular camera, etc. In detail, a transformation relation between the camera coordinate system and the image coordinate system may be determined based on the camera intrinsic parameters, and the target 3D image parameters are transformed into the target 3D camera parameters based on the transformation relation.

In the technical solution according to embodiments of the present disclosure, the image of the target object captured by the monocular camera is detected to obtain the 2D image parameters and the initial 3D image parameters with errors for the target object. Based on the disturbance range of 3D parameters and the initial 3D image parameters, the candidate 3D image parameters are determined. The initial 3D image parameters are optimized based on the 2D image parameters and the candidate 3D image parameters to obtain the target 3D image parameters. The 3D detection result in the camera coordinate system is obtained based on the target 3D image parameters. This technical solution optimizes the vertexes of the 3D detection frame contained in the image of the object captured by the monocular camera, with low cost, high efficiency and high accuracy.

FIG. 3 is a flowchart illustrating a 3D object detection method according to some embodiments of the present disclosure. Embodiments illustrated in FIG. 3 is an alternative solution to the above embodiments. As illustrated in FIG. 3, the 3D object detection method according to embodiments of the present disclosure may include the following.

At block 210, 2D image parameters and initial 3D image parameters are determined for a target object based on an image of the target object captured by a monocular camera.

At block 220, candidate 3D image parameters are determined for the target object based on a disturbance range of 3D parameters and the initial 3D image parameters determined for the target object.

At block 230, candidate 3D image parameters are filtered based on a right-angle constraint of object bottom vertexes.

Since the initial 3D image parameters determined through the network estimation in the block 210 have errors, an optimization target may be defined by projecting the bottom vertexes to optimize the bottom vertexes of the 3D detection frame of the target object, and thus top vertexes of the 3D detection frame may be optimized accordingly.

Due to the errors, an initial bottom vertex angle of the 3D detection frame is generally not a right angle. That is, projections of the initial bottom vertexes of the 3D detection frame on a ground coordinate system may be a parallelogram or even an irregular quadrilateral. The bottom vertex angle refers to an intersection angle between a line defined by both a bottom vertex and an adjacent bottom vertex and a line defined by both the bottom vertex and another adjacent bottom vertex. The initial bottom vertex angle is the bottom vertex angle of the initial bottom vertexes. In some examples, for four bottom vertexes, totally 4 bottom vertex angles may be determined. In order to ensure that the projections of the target bottom vertexes of the 3D detection frame on the ground coordinate system form a rectangle, a right-angle constraint and optimization may be performed to optimize the initial bottom vertex angle to the right angle. That is, the ground coordinate system is configured as an intermediate bridge to perform the right-angle constraint and optimization. In detail, multiple candidate bottom vertex groups are obtained based on the candidate bottom vertexes of the 3D detection frame. Each candidate bottom vertex group includes all bottom vertexes of the 3D detection frame. (That is, each candidate bottom vertex group includes those respectively selected from candidate bottom vertexes of each bottom vertex of the 3D detection frame.) For example, each candidate bottom vertex group includes one selected from the candidate bottom vertexes of the bottom vertex 0, one selected from the candidate bottom vertexes of the bottom vertex 1, and one selected from the candidate bottom vertexes of the bottom vertex 2. The candidate bottom vertex group that satisfies the right-angle constraint may be left for subsequent processing, i.e., the candidate bottom vertex group that does not satisfy the right-angle constraint is filtered out. By selecting the candidate 3D image parameters that satisfy the right-angle constraint on the ground coordinate system for further processing, the accuracy of the 3D detection may be improved.

At block 240, the target 3D image parameters are selected from the candidate 3D image parameters that satisfy the right-angle constraint based on the 2D image parameters and a distance constraint between the object bottom vertexes and the 2D detection frame. The 3D detection result of the target object is determined based on the target 3D image parameters.

In embodiments of the present disclosure, the optimization is also performed based on the constraint relation between the 3D projection and the 2D detection frame. Distances between the candidate bottom vertexes in the candidate bottom vertex group satisfying the right-angle constraint and the 2D detection frame are determined, and the target 3D image parameters are selected based on the distance constraint.

In some implementations, the block 240 may include the following. A distance between each candidate bottom vertex group satisfying the right-angle constraint and the 2D detection frame is determined based on the image positions of the candidate bottom vertexes contained in the bottom vertex group and an image boundary of the 2D detection frame. The candidate bottom vertex group corresponding to a minimum distance is determined as the target bottom vertex group. The target 3D image parameters are determined based on the image positions of the target bottom vertexes contained in the target bottom vertex group.

In detail, a distance constraint loss function may be constructed and represented by:

$$\text{Loss}=\text{abs}(C_0(u)-bb_{2d}.u_{min})+\text{abs}(C_1(v)-bb_{2d}.v_{max})+\text{abs}(C_2(u)-bb_{2d}.u_{max});$$

where, Loss is a loss value, $C_0(u)$ is a pixel position of the candidate bottom vertex 0 contained in the candidate bottom vertex group on the u axis, $C_1(v)$ is a pixel position of the candidate bottom vertex 1 contained in the candidate bottom vertex group on the v axis, $C_2(u)$ is a pixel position of the candidate bottom vertex 2 contained in the candidate bottom vertex group on the u axis, $bb_{2d}.u_{min}$ and $bb_{2d}.u_{max}$ are respectively the minimum value and the maximum value of the 2D detection frame on the u axis, and $V_{max}$ is the maximum value of the 2D detection frame on the v axis. As illustrated in FIG. 2, Loss represents a distance between the candidate bottom vertex group and the 2D detection frame.

In detail, after the target bottom vertex group is obtained based on the value of Loss, the top vertexes of the 3D detection frame may be optimized accordingly such that image positions of eight optimized target vertexes of the 3D detection frame are obtained. The image positions of these eight target vertexes are transformed to parameters in the camera coordinate system to obtain the 3D detection result of the target object.

By determining the candidate bottom vertex group corresponding to the smallest distance with respect to the 2D detection frame as the target bottom vertex group, the target bottom vertex group is closest to the 2D detection frame, thereby further improving the accuracy of the 3D detection result of the target object.

With the technical solution according to embodiments of the present disclosure, an optimization target is constructed with the ground coordinate system as the intermediate bridge and based on the bottom right-angle constraint and the distance constraint, so that the target bottom vertex group is closest to the 2D detection frame, thereby further improving the accuracy of the 3D detection result of the target object.

FIG. 4 is a flowchart illustrating a 3D object detection method according to some embodiments of the present disclosure. Embodiments illustrated in FIG. 4 are an alternative solution to the above embodiments. As illustrated in FIG. 4, the 3D object detection method according to embodiments of the present disclosure may include the following.

At block 310, 2D image parameters and initial 3D image parameters are determined for a target object based on an image of the target object captured by a monocular camera.

The 2D image parameters determined for the target object may be image parameters of a 2D detection frame of the target object. The initial 3D image parameters determined for the target object may be image positions of initial vertexes of the 3D detection frame of the target object. For example, the initial 3D image parameters may be image positions of three initial bottom vertexes of the 3D detection frame.

At block 320, candidate 3D image parameters are determined for the target object based on a disturbance range of 3D parameters and the initial 3D image parameters determined for the target object.

The candidate 3D image parameters are image positions of candidate bottom vertexes of the 3D detection frame.

At block 330, the image positions of the candidate bottom vertexes are transformed to ground positions of the candidate bottom vertexes in a ground coordinate system.

In some examples, the block 330 may include the following.

A. The image positions of the candidate bottom vertexes are transformed to camera positions of the candidate bottom vertexes in a camera coordinate system based on camera intrinsic parameters.

In detail, a depth of a candidate bottom vertex may be determined and represented by:

$$Img_p = \begin{bmatrix} Corner_u \\ Corner_v \\ 1 \end{bmatrix};$$

$$point_{cam} = K^{-1} * Img_p; \text{ and}$$

$$Depth = -d \Big/ \left( a * \frac{point_{cam}[x]}{point_{cam}[z]} + b * \frac{point_{cam}[y]}{point_{cam}[z]} + c \right);$$

where, ($Corner_u$, $Corner_v$) is the image position of the candidate bottom vertex, $Img_p$ is an intermediate variable, $point_{cam}[x]$, $point_{cam}[y]$ and $point_{cam}[z]$ represent coordinates of the camera position of the candidate bottom vertex, K is the intrinsic parameter of the camera, $K^{-1}$ is an inverse of K, Depth is a depth of the candidate bottom vertex, and a, b, c and d are determined based on a ground equation: $ax+by+cz+d=0$.

The camera position of the candidate bottom vertex may be determined and represented as follows:

$$P_c = Depth * K^{-1} * Img_p;$$

where, $P_c$ is the camera position of the candidate bottom vertex.

B. The camera position of the candidate bottom vertex is transformed to a ground position of the candidate bottom vertex in a ground coordinate system based on a transformation relation between the camera coordinate system and the ground coordinate system.

In some examples, the transformation relation between the camera coordinate system and the ground coordinate system may be determined based on a ground equation and any position on the x axis in the camera coordinate system.

In detail, the ground equation may be $ax+by+cz+d=0$, where a ground normal vector may be $\vec{n}=(a, b, c)$, and then a z-axis normal vector of the ground coordinate system may be represented as $G_{\vec{z}}=Norm(\vec{n})$, where Norm( ) represents the normalization of a vector. Accordingly, transforming a point $P_x(1,0,0)$ on the x axis in the camera coordinate system to the ground coordinate system may be represented as: $G_{\vec{x}}=P_x-P_x \cdot (G_{\vec{z}})*G_{\vec{z}}$ and $G_{\vec{x}}$ may be normalized. The y-axis vector of the ground coordinate system may be obtained based on the characteristic that the x-axis, the y-axis and the z-axis vectors are perpendicular to each other, $G_{\vec{y}}=G_{\vec{z}} \times G_{\vec{x}}$. The transformation equation of transforming the camera coordinate system to the ground coordinate system is represented as $$T_{c2g} = \begin{bmatrix} G_{\vec{x}} \\ G_{\vec{y}} \\ G_{\vec{z}} \end{bmatrix}.$$

Determining the transformation relation between the camera coordinate system and the ground coordinate system based on a known ground normal vector provides a basis for taking the ground coordinate system as the intermediate bridge.

At block 340, the candidate bottom vertex ground satisfying the right-angle constraint of the object bottom vertex are selected based on the ground positions of the candidate bottom vertexes.

The candidate bottom vertex group includes at least three candidate bottom vertexes. For each of three bottom vertexes (such as the bottom vertexes 0, 1, and 2) of the 3D detection frame, the candidate bottom vertex group is determined by determining the candidate positions of each bottom vertex.

In some examples, the block 340 may include the following. A candidate bottom vertex angle of candidate bottom vertexes contained in the candidate bottom vertex group is determined based on the ground positions of the candidate bottom vertexes. In cases where a difference between the candidate bottom vertex angle and a right angle is less than an angle threshold, it may be determined that the candidate bottom vertex group satisfies the right angle constraint of the object bottom vertex. The angle threshold may be generally within [0, 5°]. That is, the candidate bottom vertex angle of the candidate bottom vertexes contained in the candidate bottom vertex group that satisfies the right-angle constraint is within [85°,95°].

In some embodiments, the method may further include determining depths of initial bottom vertexes based on image positions of the initial bottom vertexes; and determining the angle threshold based on the depths of the initial bottom vertexes.

The depth of an initial bottom vertex may be determined based on the image position of the initial bottom vertex, the camera intrinsic parameters, and the ground equation. Since the depths of the initial bottom vertexes are similar to each other, an average value of the depths of the initial bottom vertexes may be determined as a depth of the target object. Considering characteristic of the visual recognition that the closer the larger and the farther the smaller, the smaller the depth is, the smaller the threshold may be set, i.e., the stricter the angle is set, which may further improve the accuracy of the 3D recognition.

At block 350, the target 3D image parameters are selected from the candidate 3D image parameters that are satisfying the right-angle constraint based on the 2D image parameters and a distance constraint of distances between object bottom vertexes and the 2D detection frame. A 3D detection result of the target object is determined based on the target 3D image parameters.

In detail, for each candidate bottom vertex group satisfying the right-angle constraint, a distance constraint loss value of the candidate bottom vertex group is determined based on a distance constraint loss function. The candidate bottom vertex group corresponding to the smallest distance constraint loss value is determined as the target bottom vertex group, to obtain the target 3D image parameters.

In the technical solution according to some embodiments of the present disclosure, in the optimization process based on the right-angle constraint of the bottom vertexes and the distance constraint, visual characteristics are fully considered to further improve the accuracy of the 3D detection result of the target object.

Figure 5:
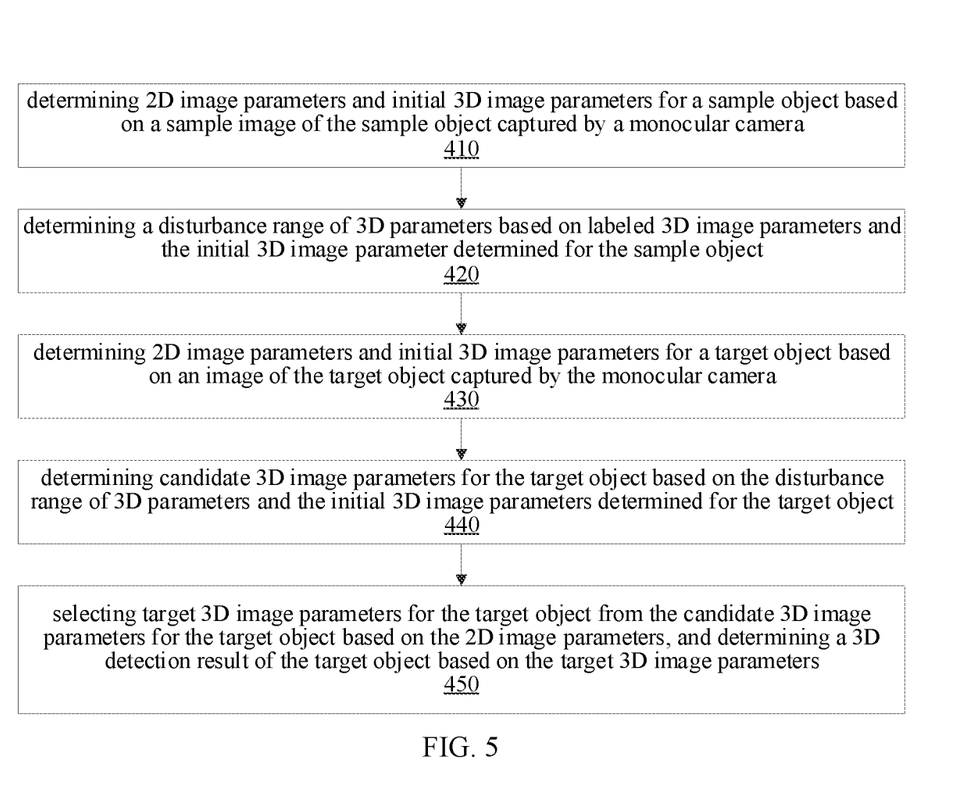
FIG. 5 is a flowchart illustrating a 3D object detection method according to some embodiments of the present disclosure.

FIG. 5 is a flowchart illustrating a 3D object detection method according to some embodiments of the present disclosure. Embodiments illustrated in FIG. 5 are an alternative solution to the above embodiments. As illustrated in FIG. 5, the 3D object detection method according to embodiments of the present disclosure may include the following.

At block 410, initial 3D image parameters of a sample object are determined based on a sample image of the sample object captured by a monocular camera.

The sample image of the sample object is a 2D image captured by a monocular camera, and object category of the sample image of the sample object is the same with the object category of the image of the target object. For example, both the object categories are vehicle. The initial 3D image parameters determined for the sample object may be the image positions of initial vertexes of a 3D detection frame of the sample object. Like the initial 3D image parameters determined for the target object, the initial 3D image parameters determined for the sample object may also have some errors.

At block 420, a disturbance range of 3D parameters is determined based on labeled 3D image parameters and the initial 3D image parameters determined for the sample object.

The labeled 3D image parameters are real 3D image parameters of the sample object, that is, the image positions of real vertexes of the 3D detection frame of the sample object. For each vertex in the 3D detection frame of the sample object, a difference between the image position of the corresponding initial vertex and the image position of the corresponding real vertex is determined. An error range of the image position may be obtained for each vertex through statistics, as the disturbance range of 3D parameters. Accurately determining the disturbance range of 3D parameters through the statistics facilitates subsequent control of the disturbance of the 3D image parameters, thereby improving the efficiency of the 3D detection.

At block 430, the 2D image parameters and the initial 3D image parameters are determined for the target object based on the image of the target object captured by the monocular camera.

The 2D image parameters determined for the target object may be image parameters of a 2D detection frame of the target object. The initial 3D image parameters may be image positions of vertexes of a 3D detection frame of the target object.

At block 440, candidate 3D image parameters are determined for the target object based on the disturbance range of 3D parameters and the initial 3D image parameters determined for the target object.

In detail, image positions of multiple candidate vertexes (i.e., the candidate 3D image parameters for the target object) may be obtained based on an image position of each initial vertex of the 3D detection frame of the target object and the disturbance range of the initial vertex.

For example, the block 440 may include the following. A disturbance step length is determined for the target object. The candidate 3D image parameters are determined for the target object based on the initial 3D image parameters, the disturbance step length, and the disturbance range of 3D parameters.

In detail, multiple disturbance values are determined based on the disturbance step length of the target object and the disturbance range of 3D parameters. Multiple candidate 3D image parameters are obtained for the target object based on the initial 3D image parameters and the multiple disturbance values.

In some examples, the method may further include the following. Depths of the initial bottom vertexes are determined based on the image positions of the initial bottom vertexes. The disturbance step length of the target object is determined based on the depths of the initial bottom vertexes. The smaller the depth of the target object is, the larger the disturbance step length is. By fully considering the visual characteristics to reasonably determine the disturbance step length, the efficiency of the 3D detection may be further improved.

At block 450, target 3D image parameters for the target object are selected from the candidate 3D image parameters for the target object based on the 2D image parameters, and a 3D detection result of the target object is determined based on the target 3D image parameters.

In the technical solution according to embodiments of the present disclosure, by reasonably determining the disturbance range of 3D parameters and by determining the disturbance step length of the target object based on the depth of the target object, the candidate 3D image parameters are determined based on disturbance step length of the target object, the initial 3D image parameters, and the disturbance range of 3D parameters, thereby improving accuracy of the candidate 3D image parameters and improving efficiency and precision of the 3D detection.

For example, the block 420 may include the following. The image of the target object captured by the monocular camera is inputted to an image detection model to obtain the 2D image parameters and the 3D detection parameters for the target object. The 3D detection parameters include size of the target object, a center-point camera position of a center point of the target object in a camera coordinate system and an orientation angle of the target object. Vertex positions of a 3D detection frame of the target object in an image coordinate system is determined based on the 3D detection parameters, as the initial 3D image parameters. By accurately determining the vertex positions of the 3D detection frame in the image coordinate system, the accuracy of the 3D detection result of the target object may be improved.

In some examples, determining the vertex positions of the 3D detection frame of the target object in the image coordinate system based on the 3D detection parameters may include the following. Center-point ground position of the central point of the target object in a ground coordinate system is determined based on the center-point camera position and a transformation relation between the camera coordinate system and the ground coordinate system. A relative position between a vertex of the target object and the center point is determined based on the size of the target object. A rotation matrix is generated based on a rotation angle of the target object. The vertex positions of the 3D detection frame of the target object in the image coordinate system are determined based on the center-position ground position, the relative position, and the rotation matrix.

In detail, the center-point ground position $P_g^{center}$ is obtained by transforming the center-point image position $P_c^{center}$ to the ground coordinate system by $T_{c2g}$ as follows:

$$P_g^{center} = T_{c2g} * P_c^{center}.$$

The rotation matrix is determined based on the orientation angle ry (Rodriguez's formula) as follows:

$$R = \begin{bmatrix} \cos(ry) & 0 & \sin(ry) \\ 0 & 1 & 0 \\ -\sin(ry) & 0 & -\cos(ry) \end{bmatrix}.$$

The relative position between the vertexes of the 3D detection frame and the center-point ground position $p_g^{center}$ in the ground coordinate system is determined as follows:

$$P_g^{3d} = \begin{bmatrix} \frac{l}{2}, \frac{l}{2}, -\frac{l}{2}, -\frac{l}{2}, \frac{l}{2}, \frac{l}{2}, -\frac{l}{2}, -\frac{l}{2} \\ \frac{h}{2}, \frac{h}{2}, \frac{h}{2}, \frac{h}{2}, -\frac{h}{2}, -\frac{h}{2}, -\frac{h}{2}, -\frac{h}{2} \\ \frac{w}{2}, -\frac{w}{2}, -\frac{w}{2}, \frac{w}{2}, \frac{w}{2}, -\frac{w}{2}, -\frac{w}{2}, \frac{w}{2} \end{bmatrix}.$$

In the ground coordinate system, based on the rotation matrix R, the relative position $P_g^{3d}$ and the $P_g^{center}$ vertex positions $P_g$ of the 3D detection frame are determined as follows:

$$P_g^{3d} = R * P_g + P_g^{center}.$$

The vertex positions $P_g$ of the 3D detection frame in the ground coordinate system are transformed to the camera coordinate system, to obtain $P_c$ as follows:

$$P_c = T_{c2g}^{-1} * P_g,$$

where, $T_{c2g}$ is the transformation equation of transforming the camera coordinate system to the ground coordinate system; and $T_{c2g}^{-1}$ is the reverse of $T_{c2g}$.

The vertex positions of the 3D detection frame in the image coordinate system are obtained based on the vertex positions of the 3D detection frame in the ground coordinate system and the camera intrinsic parameters.

It should be noted, the 3D detection parameters of the sample object are determined in the same way as the 3D detection parameter of the target object, which will not be repeated here.

Figure 6:
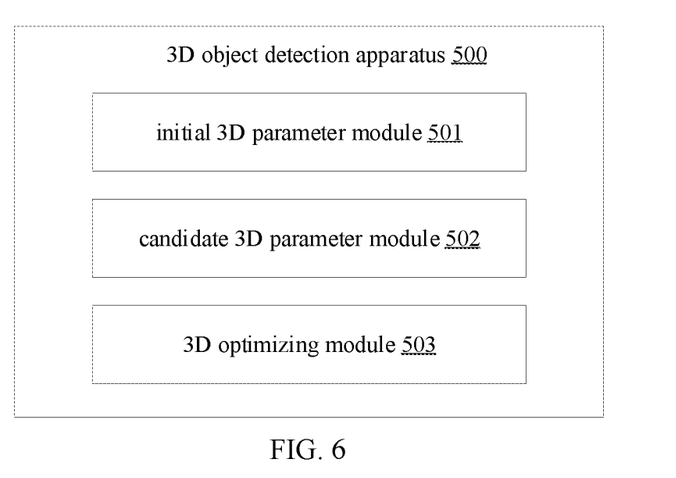
FIG. 6 is a schematic diagram illustrating a 3D object detection apparatus according to some embodiments of the present disclosure.

FIG. 6 is a schematic diagram illustrating a 3D object detection apparatus according to some embodiments of the present disclosure. As illustrated in FIG. 6, the 3D object detection apparatus is provided according to embodiments of the present disclosure, including an initial 3D parameter module 501, a candidate 3D parameter module 502 and a 3D optimizing module 503.

The initial 3D parameter module 501 is configured to determine 2D image parameters and initial 3D image parameters for a target object based on an image of the target object captured by a monocular camera.

The candidate 3D parameter module 502 is configured to determine candidate 3D image parameters for the target object based on a disturbance range of 3D parameters and the initial 3D image parameters determined for the target object.

The 3D optimizing module 503 is configured to select target 3D image parameters for the target object from the candidate 3D image parameters determined for the target object based on the 2D image parameters, and determine a 3D detection result of the target object based on the target 3D image parameters.

In some examples, the 3D optimizing module 503 includes a right-angle constrain filtering unit and distance constraint filtering unit.

The right-angle constrain filtering unit is configured to filter the candidate 3D image parameters determined for the target object based on a right-angle constraint of object bottom vertexes.

The distance constrain filtering unit is configured to select the target 3D image parameters from the candidate 3D image parameters satisfying the right-angle constraint based on the 2D image parameter and a distance constraint of distances between the object bottom vertexes and a 2D detection frame.

In some examples, the candidate 3D image parameters determined for the target object are image positions of candidate bottom vertexes of a 3D detection frame.

Accordingly, the right-angle constrain filtering unit includes a ground position subunit and a right-angle constraint filtering subunit.

The ground position subunit is configured to transform the image positions of the candidate bottom vertexes to ground positions of the candidate bottom vertexes in a ground coordinate system.

The right-angle constrain filtering subunit is configured to select a candidate bottom vertex group satisfying the right-angle constraint of object bottom vertexes based on the ground positions of the candidate bottom vertexes. The candidate bottom vertex group includes at least three candidate bottom vertexes.

In some examples, the ground position subunit is configured to transform the image positions of the candidate bottom vertexes to camera positions of the candidate bottom vertexes in a camera coordinate system based on camera intrinsic parameters; and transform the camera positions of the candidate bottom vertexes to ground positions of the candidate bottom vertexes in a ground coordinate system based on a transformation relation between the camera coordinate system and the ground coordinate system.

In some examples, the right-angle constraint filtering subunit is configured to determine a bottom vertex angle of bottom vertexes contained in the candidate bottom vertex group based on the ground positions of the candidate bottom vertexes; and in cases where a difference between the bottom vertex angle of the bottom vertexes contained in the candidate bottom vertex group and a right angle is less than an angle threshold, determine that the candidate bottom vertex group satisfies the right-angle constraint of object bottom vertexes.

In some embodiments, the initial 3D image parameters are image positions of initial bottom vertexes of the 3D detection frame of the target object.

Accordingly, the right-angle constrain filtering subunit is further configured to determine depths of the initial bottom vertexes based on the image positions of the initial bottom vertexes; and determine the angle threshold based on the depths of the initial bottom vertexes.

In some embodiments, the 2D image parameters for the target object is an image boundary of a 2D detection frame of the target object. The candidate 3D image parameters for the target object are image positions of candidate bottom vertexes of the 3D detection frame.

Accordingly, the distance constrain filtering unit includes a distance determining subunit and a distance constraint subunit.

The distance determining subunit is configured to determine a distance between each candidate bottom vertex group satisfying the right-angle constraint and the 2D detection frame based on the image positions of candidate bottom vertexes contained in the candidate bottom vertex group and the image boundary of the 2D detection frame.

The distance constraint subunit is configured to determine the candidate bottom vertex group corresponding to a minimum distance as a target bottom vertex group, and determine the target 3D image parameters based on the image positions of the target bottom vertexes contained in the target bottom vertex group.

In some examples, the apparatus further includes a disturbance range module. The disturbance range module includes a sample initial parameter unit and a distance range unit.

The sample initial parameter unit is configured to determine initial 3D image parameters for a sample object based on a sample image of the sample object captured by a monocular camera.

The disturbance range unit is configured to determine a disturbance range of 3D parameters based on labeled 3D image parameters and the initial 3D image parameters determined for the sample object.

In some examples, the candidate 3D parameter module 502 includes a disturbance step length unit and a candidate 3D parameter unit.

The disturbance step length unit is configured to determine a disturbance step length of the target object.

The candidate 3D parameter unit is configured to determine the candidate 3D image parameters for the target object based on the initial 3D image parameters, the disturbance step length, and the disturbance range of 3D parameters.

In some examples, the initial 3D image parameters are image positions of initial bottom vertexes of the 3D detection frame of the target object.

Accordingly, the disturbance step length unit is configured to determine depths of the initial bottom vertexes based on the image positions of the initial bottom vertexes; and determine the disturbance step length of the target object based on the depths of the initial bottom vertexes.

In some embodiments, the initial 3D parameter module 501 includes a parameter detecting unit and a parameter determining unit.

The parameter detection unit is configured to input the image of the target object captured by the monocular camera into an image detection model to obtain the 2D image parameters and 3D detection parameters for the target object. The 3D detection parameters include size of the target object, a center-point camera position of a center point of the target object in a camera coordinate system and an orientation angle.

The parameter determining unit is configured to determine vertex positions of the 3D detection frame of the target object in an image coordinate system based on the 3D detection parameters, as the initial 3D image parameters.

In some examples, the parameter determining unit is configured to determine a center-point ground position in a ground coordinate system based on the center-point camera position and a transformation relation between the camera coordinate system and the ground coordinate system; determine a relative position between a vertex of the target object and the center point of the target object based on the size of the target object; construct a rotation matrix based on an rotation angle of the target object; and determine vertex positions of the 3D detection frame of the target object in the image coordinate system based on the center-point ground position, the relative position, and the rotation matrix.

In some examples, the apparatus further includes a transformation relation determining module. The transformation relation determining module is configured to determine a transformation relation between the camera coordinate system and the ground coordinate system based on a ground equation and any position on an x-axis in the camera coordinate system.

In some examples, the 3D optimizing module 503 is configured to transform the target 3D image parameters to target 3D camera parameters in the camera coordinate system based on the camera intrinsic parameters, as a 3D detection result of the target object.

In the technical solution according to embodiments of the present disclosure, the initial vertexes having certain errors are optimized for the 3D detection frame based on the 3D object detection with the monocular image, the constraint relation between the 2D detection frame and vertexes of the 3D detection frame, and the ground equation, thereby improving precision and robustness of the 3D detection.

Embodiments of the present disclosure further provide an electronic device and a readable storage medium.

Figure 7:
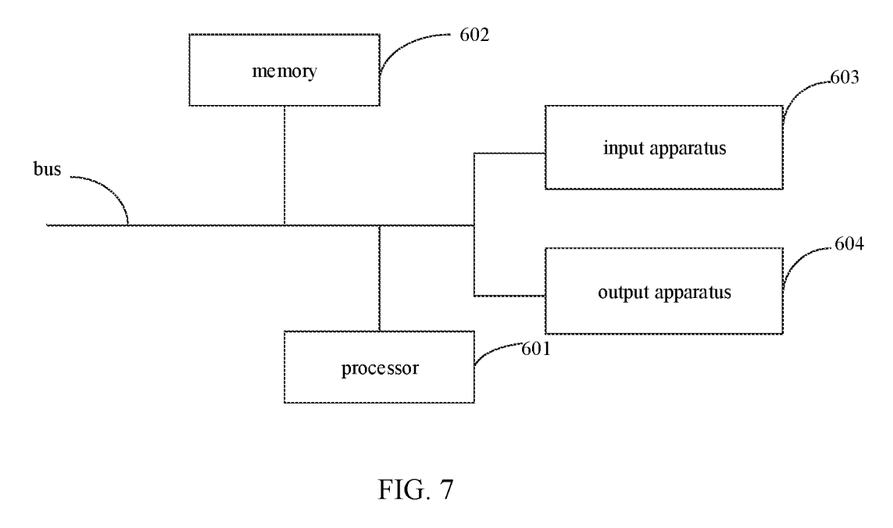
FIG. 7 is a block diagram illustrating an electronic device configured to implement a 3D object detection method according to some embodiments of the present disclosure.

FIG. 7 is a block diagram illustrating an electronic device for implementing a 3D object detection method according to some embodiments of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile devices, such as personal digital assistants, cellular phones, smart phones, wearable devices, and other similar computing devices. The components discussed herein, their connections and relations, and their functions are merely examples, and are not intended to limit implementation of the present disclosure described and/or required herein.

As illustrated in FIG. 7, the electronic device includes one or more processors 601, a memory 602, and an interface configured to connect various components, including a high-speed interface and a low-speed interface. The various components are connected to each other with different buses, and may be installed on a public main board or installed in other ways as needed. The processor may process instructions executed in the electronic device, including instructions stored in or on the memory to display graphical information of a GUI (graphic user interface) on an external input/output apparatus (such as a display device coupled to an interface). In other implementations, multiple processors and/or multiple buses may be used together with multiple memories if necessary. Similarly, multiple electronic devices may be connected, and each device provides a part of necessary operations (for example, as a server array, a set of blade servers, or a multi-processor system). In FIG. 7, one processor 601 is taken as an example for description.

The memory 602 is a non-transitory computer-readable storage medium according to the present disclosure. The memory stores instructions executable by the at least one processor, so that the at least one processor executes the 3D object detection method as described in the present disclosure. The non-transitory computer-readable storage medium according to the present disclosure stores computer instructions. The computer instructions are configured to cause a computer to execute the 3D object detection method according to the present disclosure.

As a non-transitory computer-readable storage medium, the memory 602 may be configured to store non-transitory software programs, non-transitory computer-executable programs and modules, such as program instructions/modules corresponding to the 3D object detection method according to the embodiments of the present disclosure (for example, an initial 3D parameter module 501, a candidate 3D parameter module 502, and a 3D optimizing module 503 illustrated in FIG. 6). The processor 601 executes various functional applications and data processing of the server by running a non-transitory software program, an instruction, and a module stored in the memory 602, that is, the 3D object detection method according to the above method embodiments is implemented.

The method 602 may include a program storage area and a data storage area. The program storage area may store operation systems and application programs required by at least one function. The data storage area may store data created based on the use of an electronic device for 3D object detection, etc. In addition, the memory 602 may include a high-speed random-access memory, and may also include a non-transitory memory, such as at least one magnetic disk storage device, a flash memory device, or other non-transitory solid-state storage devices. In some embodiments, the memory 602 optionally includes a memory set remotely relative to the processor 601 that may be connected to an electronic device for 3D object detection via a network. The example of the above networks includes but not limited to an Internet, an enterprise intranet, a local area network, a mobile communication network and their combination.

An electronic device for implementing a 3D object detection method may further include an input apparatus 603 and an output apparatus 604. The processor 601, the memory 602, the input apparatus 603, and the output apparatus 604 may be connected through a bus or in other ways. In FIG. 7, the connection through a bus is taken as an example for description.

The input apparatus 603 may receive input digital or character information, and generate key signal input related to user setting and function control of an electronic device for 3D object detection, such as a touch screen, a keypad, a mouse, a track pad, a touch pad, an indicating rod, one or more mouse buttons, a trackball, a joystick and other input apparatuses. The output apparatus 604 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, the display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit data and instructions to the storage system, the at least one input apparatus, and the at least one output apparatus.

The computer programs (also referred to as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receives machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or an LCD (liquid crystal display) monitor); and a keyboard and a pointing apparatus (for example, a mouse or a trackball) through which the user may provide input for the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including a back-end component (for example, as a data server), or a computing system including a middleware component (for example, an application server), or a computing system including a front-end component (for example, a user computer with a graphical user interface or a web browser through which the user may interact with the implementation mode of the system and technology described herein), or a computing system including any combination of such back-end component, middleware component or front-end component. The system components may be connected to each other through any form or medium of digital data communication (for example, a communication network). Examples of communication networks include: a local area network (LAN), a wide area network (WAN), a blockchain network, and an internet.

The computer system may include a client and a server. A client and a server are generally far away from each other and generally interact with each other through a communication network. The relation between the client and the server is generated by computer programs that run on the corresponding computer and have a client-server relation with each other.

According to the technical solution according to embodiments of the present disclosure, based on the 3D object detection via a monocular image, the constraint relation between the 2D detection frame and vertexes of the 3D detection frame, and the ground equation, incorrectly estimated initial vertexes of the 3D detection frame may be optimized, to improve precision and robustness of the 3D detection.

It should be understood, various forms of procedures shown above may be configured to reorder, add, or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, subcombinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A three-dimensional (3D) object detection method, comprising:
   determining two-dimensional (2D) image parameters and initial 3D image parameters for a target object based on an image of the target object captured by a monocular camera;
   determining candidate 3D image parameters for the target object based on a disturbance range of 3D parameters and the initial 3D image parameters determined for the target object; and
   selecting target 3D image parameters for the target object from the candidate 3D image parameters for the target object based on the 2D image parameters, and determining a 3D detection result of the target object based on the target 3D image parameters.

2. The method of claim 1, wherein selecting the target 3D image parameters comprises:
   filtering the candidate 3D image parameters determined for the target object based on a right-angle constraint of object bottom vertexes; and
   selecting the target 3D image parameters from the candidate 3D image parameters satisfying the right-angle constraint based on the 2D image parameters and a distance constraint of distances between the object bottom vertexes and a 2D detection frame.

3. The method of claim 2, wherein the candidate 3D image parameters determined for the target object are image positions of candidate bottom vertexes of a 3D detection frame of the target object;
   and wherein filtering the candidate 3D image parameters comprises:
   transforming the image positions of the candidate bottom vertexes to ground positions of the candidate bottom vertexes in a ground coordinate system; and
   selecting a candidate bottom vertex group satisfying the right-angel constraint of the object bottom vertexes based on the ground positions of the candidate bottom vertexes having at least three candidate bottom vertexes.

4. The method of claim 3, wherein transforming the image positions comprises:
   transforming the image positions of the candidate bottom vertexes to camera positions of the candidate bottom vertexes in a camera coordinate system based on camera intrinsic parameters; and
   transforming the camera positions of the candidate bottom vertexes to the ground positions of the candidate bottom vertexes in the ground coordinate system based on a transformation relation between the camera coordinate system and the ground coordinate system.

5. The method of claim 3, wherein selecting the candidate bottom vertex group comprises:
   determining a bottom vertex angle of candidate bottom vertexes contained in the candidate bottom vertex group based on the ground positions of the candidate bottom vertexes; and
   when a difference between the bottom vertex angle of the candidate bottom vertexes contained in the candidate bottom vertex group and a right angle is less than an angle threshold, determining that the candidate bottom vertex group satisfies the right-angle constraint of object bottom vertexes.

6. The method of claim 5, wherein the initial 3D image parameters are image positions of initial bottom vertexes of the 3D detection frame of the target object;
   and further comprising:
   determining depths of the initial bottom vertexes based on the image positions of the initial bottom vertexes; and
   determining the angle threshold based on the depths of the initial bottom vertexes.

7. The method of claim 2, wherein the 2D image parameters determined for the target object are an image boundary of the 2D detection frame of the target object and wherein the candidate 3D image parameters determined for the target object are image positions of candidate bottom vertexes of a 3D detection frame of the target object; and wherein selecting the target 3D image parameters comprises: determining a distance between each candidate bottom vertex group satisfying the right-angle constraint and the 2D detection frame based on the image positions of the candidate bottom vertexes contained in the candidate bottom vertex group and the image boundary of the 2D detection frame; and determining the candidate bottom vertex group corresponding to a minimum distance as a target bottom vertex group, and determining the target 3D image parameters based on the image positions of target bottom vertexes contained in the target bottom vertex group.

8. The method of claim 1, further comprising, and before determining the candidate 3D image parameters:
   determining initial 3D image parameters for a sample object based on a sample image of the sample object captured by the monocular camera; and
   determining the disturbance range of 3D parameters based on labeled 3D image parameters and the initial 3D image parameters determined for the sample object.

9. The method of claim 1, wherein determining the candidate 3D image parameters comprises:
   determining a disturbance step length of the target object; and
   determining the candidate 3D image parameters for the target object based on the initial 3D image parameters determined for the target object, the disturbance step length, and the disturbance range of 3D parameters.

10. The method of claim 9, wherein the initial 3D image parameters are image positions of initial bottom vertexes of a 3D detection frame of the target object;
    and wherein determining the disturbance step length of the target object comprises:
    determining depths of the initial bottom vertexes based on the image positions of the initial bottom vertexes;
    determining the disturbance step length of the target object based on the depths of the initial bottom vertexes.

11. The method of claim 1, wherein determining the 2D image parameters and the initial 3D image parameters for the target object comprises:
    inputting the image of the target object captured by the monocular camera into an image detection model to obtain the 2D image parameters and 3D detection parameters for the target object; the 3D detection parameters comprising size of the target object, a center-point camera position of a center point of the target object in a camera coordinate system and an orientation angle of the target object; and determining vertex positions of a 3D detection frame of the target object in an image coordinate system based on the 3D detection parameters, as the initial 3D image parameters.

12. The method of claim 11, wherein determining the vertex positions comprises: determining a center-point ground position in a ground coordinate system based on the center-point camera position and a transformation relation between the camera coordinate system and the ground coordinate system; determining a relative position between a vertex of the target object and the center point of the target object based on the size of the target object; constructing a rotation matrix based on the orientation angle of the target object; and determining the vertex positions of the 3D detection frame of the target object in the image coordinate system based on the center-point ground position, the relative position, and the rotation matrix.

13. The method of claim 4, further comprising:
determining the transformation relation between the camera coordinate system and the ground coordinate system based on a ground equation and a position on an x axis in the camera coordinate system.

14. The method of claim 1, wherein determining the 3D detection result comprises:
transforming the target 3D image parameters to a camera coordinate system based on camera intrinsic parameters, to obtain target 3D camera parameters as the 3D detection result of the target object.

15. An electronic device, comprising:
at least one processor; and
a memory communicating with the at least one processor;
wherein the memory is configured to store instructions executable by the at least one processor, when the instructions are executed by the at least one processor, the at least one processor is configured to:
determine two-dimensional (2D) image parameters and initial 3D image parameters for a target object based on an image of the target object captured by a monocular camera;
determine candidate 3D image parameters for the target object based on a disturbance range of 3D parameters and the initial 3D image parameters determined for the target object; and
select target 3D image parameters for the target object from the candidate 3D image parameters for the target object based on the 2D image parameters, and determine a 3D detection result of the target object based on the target 3D image parameters.

16. The electronic device of claim 15, wherein the at least one processor is further configured to:
filter the candidate 3D image parameters determined for the target object based on a right-angle constraint of object bottom vertexes; and
select the target 3D image parameters from the candidate 3D image parameters satisfying the right-angle constraint based on the 2D image parameters and a distance constraint of distances between the object bottom vertexes and a 2D detection frame.

17. The electronic device of claim 16, wherein the candidate 3D image parameters determined for the target object are image positions of candidate bottom vertexes of a 3D detection frame of the target object; and wherein the at least one processor is further configured to:
transform the image positions of the candidate bottom vertexes to ground positions of the candidate bottom vertexes in a ground coordinate system; and
select a candidate bottom vertex group satisfying the right-angel constraint of the object bottom vertexes based on the ground positions of the candidate bottom vertexes having at least three candidate bottom vertexes.

18. The electronic device of claim 16, wherein the 2D image parameters determined for the target object are an image boundary of the 2D detection frame of the target object and the candidate 3D image parameters determined for the target object are image positions of candidate bottom vertexes of a 3D detection frame of the target object; and wherein the at least one processor is further configured to:
determine a distance between each candidate bottom vertex group satisfying the right-angle constraint and the 2D detection frame based on the image positions of the candidate bottom vertexes contained in the candidate bottom vertex group and the image boundary of the 2D detection frame; and determine the candidate bottom vertex group corresponding to a minimum distance as a target bottom vertex group, and determine the target 3D image parameters based on the image positions of target bottom vertexes contained in the target bottom vertex group.

19. The electronic device of claim 15, wherein the at least one processor is further configured to:
determine initial 3D image parameters for a sample object based on a sample image of the sample object captured by the monocular camera; and
determine the disturbance range of 3D parameters based on labeled 3D image parameters and the initial 3D image parameters determined for the sample object.

20. A non-transitory computer-readable storage medium, having computer instructions stored thereon, wherein the computer instructions are configured to cause a computer to execute a 3D object detection method, the method comprising:
determining two-dimensional (2D) image parameters and initial 3D image parameters for a target object based on an image of the target object captured by a monocular camera;
determining candidate 3D image parameters for the target object based on a disturbance range of 3D parameters and the initial 3D image parameters determined for the target object; and
selecting target 3D image parameters for the target object from the candidate 3D image parameters for the target object based on the 2D image parameters, and determining a 3D detection result of the target object based on the target 3D image parameters.

* * * * *